United States Patent
Oh et al.

(10) Patent No.: US 7,643,241 B2
(45) Date of Patent: Jan. 5, 2010

(54) METHODS CALCULATING RRO AND RRO COMPENSATION VALUE IN HDD

(75) Inventors: Dong-ho Oh, Seoul (KR); Yong-kyu Byun, Yongin-si (KR); Sang-eun Baek, Incheon Metropolitan (KR); Jong-youp Shim, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 547 days.

(21) Appl. No.: 11/476,652

(22) Filed: Jun. 29, 2006

(65) Prior Publication Data

US 2007/0008644 A1 Jan. 11, 2007

(30) Foreign Application Priority Data

Jun. 29, 2005 (KR) .................. 10-2005-0057140

(51) Int. Cl.
*G11B 5/596* (2006.01)

(52) U.S. Cl. .................. 360/77.04; 360/77.07

(58) Field of Classification Search ............ None
See application file for complete search history.

(56) References Cited

U.S. PATENT DOCUMENTS

| | | | |
|---|---|---|---|
| 5,065,263 A * | 11/1991 | Yoshida et al. ........... | 360/77.03 |
| 5,793,559 A | 8/1998 | Shepherd et al. | |
| 6,049,440 A | 4/2000 | Shu | |
| 6,061,200 A | 5/2000 | Shepherd et al. | |
| 6,449,116 B2 | 9/2002 | Morris et al. | |
| 6,937,424 B2 * | 8/2005 | Chang et al. ........... | 360/77.04 |
| 7,193,808 B2 * | 3/2007 | Takaishi .............. | 360/77.04 |
| 2001/0043428 A1 * | 11/2001 | Morris et al. ........... | 360/77.04 |
| 2003/0030936 A1 | 2/2003 | Smith et al. | |

FOREIGN PATENT DOCUMENTS

| | | |
|---|---|---|
| JP | 2004-342298 | 12/2004 |
| KR | 1995-006806 | 3/1995 |
| KR | 100194021 | 2/1999 |
| KR | 2003-013403 | 2/2003 |

* cited by examiner

*Primary Examiner*—Jason C Olson
(74) *Attorney, Agent, or Firm*—Volentine & Whitt, PLLC

(57) ABSTRACT

Provided are a method of calculating repeatable runout (RRO) of a hard disk drive (HDD) in a frequency domain, a method of calculating a compensation value using the RRO calculating method, and recording media used therefore. The method of calculating RRO in a disk with a plurality of tracks includes: calculating first set of frequency coefficients for representing the RRO by analyzing a position error signal (PES), which is sampled in a target track, in a frequency domain while a head follows the target track; and calculating the RRO using the first set of frequency coefficients.

12 Claims, 18 Drawing Sheets

METHODS CALCULATING RRO AND RRO COMPENSATION VALUE IN HDD

BACKGROUND OF THE INVENTION

1. Field of the Invention

Embodiments of the invention relate to a disturbance compensation mechanism and method adapted for use with a hard disk drive (HDD). More particularly, embodiments of the invention relate to methods of calculating a repeatable disturbance in the frequency domain, and calculating a repeatable runout (RRO) compensation value using the repeatable disturbance calculating method.

This application claims the benefit of Korean Patent Application No. 10-2005-0057140 filed on Jun. 29, 2005, the subject matter of which is incorporated herein in its entirety by reference.

2. Description of the Related Art

The storage density of contemporary hard disk drives (HDDs) has greatly increased due to the development of improved magneto-resistive (MR) head technology. For example, current product proposals include a device capable of storing 80 GBytes of data per disk and having a track density of 93,000 tracks per inch (TPI) and a track width of 0.27 μm. Further, it is expected that new product developments will allow implementation of a device capable of storing 120 GByte of data per disk.

Within the context of these products, a technique for precisely controlling head position is required so that the head may precisely write or read data to or from such fine tracks. The head position is controlled in an HDD so that the head can precisely follow the center of a target track. However, no matter how well a controller controls head position, some degree of control error due to various types of disturbance are bound to happen. Disturbances in the context of an HDD may be classified into repeatable disturbances (e.g., the so-called repeatable runout (RRO) disturbance generated by disk eccentricities) and non-repeatable disturbances (e.g., the so-called non-repeatable runout (NRRO) disturbances generated by disk flutter caused, for example, by an external impact to the HDD). In this context, the term "repeatable" means the magnitude and phase of a runout vary periodically. That is, runout occurs periodically and the phase of the runout is synchronized with a servo sector of the disk.

RRO occurs due to deviations of a disk center from a defined center of disk rotation. RRO becomes especially critical when an offline servo writing technique is used in the HDD. For example, when disks of an HDD having a data density of 93,000 TPI is assembled using an offline servo writing method, an RRO error of greater than 200 tracks may be expected. Because such a gross RRO error leads to extreme deterioration in the performance of the HDD, it is necessary to compensate for the RRO error.

FIG. 1 is a block diagram of a conventional track following device. In FIG. 1, uc denotes a control output of a controller 102, y denotes an output of a plant 104, for example, a position of a head, d denotes a disturbance signal (d=drro+dnrro), and PES denotes a position error signal input to the controller 102.

Since a reference input is zero (0) in an ideal track following state (i.e., mode), the position error signal PES is essentially generated by disturbance signal d. In the track following device of FIG. 1, assuming that transfer functions of both controller 102 and plant 104 are C(z) and P(z), respectively, the position error signal PES at an nth servo sample, (PES(n)) is given by, $$PES(n) = S(z)d(n) \quad (1)$$

where d(n) denotes the magnitude of disturbance at the nth servo sample.

From Equation 1, repeatable disturbance drro(n) is given by, $$\begin{aligned} d_{rro}(n) &= S^{-1}(z) RPES(n) \\ &= (1 + P(z)C(z)) RPES(n) \\ &= (RPES(n) + P(z)C(z) RPES(n)) \\ &= (RPES(n) + P(z)u(n)) \end{aligned} \quad (2)$$

where S denotes a sensitivity function for both controller 102 and plant 104 of the track following device of FIG. 1, and RPES denotes the PES generated by repeatable disturbance drro.

Referring to Equation 2, it can be seen that the repeatable disturbance drro(n) is determined by RPES(n), P(z)b and C(z). RPES can be obtained by sampling the position error signal PES in the tracking following mode, and transfer functions P(z) and C(z) can be obtained using previously defined values. In calculating the repeatable disturbance drro(n) using Equation 2, the RPES(n) should be measured precisely since both transfer functions P(z) and C(z) are fixed values. That is, it is necessary to measure the position error signal PES in every revolution of the disk to eliminate the effect of NRRO and to average the position error signal PES through several revolutions of the disk.

After a RRO compensation value (Rdrro) adapted to compensate for RRO has been obtained using the repeatable disturbance drro, Rdrro is stored in an RRO lookup table 106 of FIG. 1. In one more specific example, Rdrro is obtained during a burn-in test for the constituent HDD and then stored on the disk. During an initial operation of the HDD, Rdrro is read from the disk and then stored in lookup table 106.

FIG. 2 is a flow chart illustrating a conventional method of calculating an RRO compensation value (Rdrro).

Referring to FIG. 2, a track following operation is performed so that the head follows a target track (S202). A position error signal PES is then sampled while the head follows the target track (S204). The position error signal PES is sampled at time intervals corresponding to servo samples. While the disk rotates a predetermined number of revolutions, the position error signal PES is detected and an average position error signal PES, i.e., PESAVG, is obtained.

Then, repeatable disturbance drro is calculated using Equation 2 (S206).

The repeatable disturbance drro is again calculated while the disk rotates through a predetermined number of revolutions, and the previous repeatable disturbance drro is corrected using the later calculated repeatable disturbance drro (S208).

Assuming that the first repeatable disturbance drro obtained in operation S206 is rcd0, rcd0(i) at an ith servo sample is given by, $$rcd_o(i) = d_{rro}(0), 0 \leq i \leq \text{serv\_sector\_max} \quad (3)$$

where "servo_sector_max" is the number of servo sectors of the corresponding track.

The error-corrected repeatable disturbance rcdm+1(i), obtained in operation S208 by an m+1th update step, is given by Equation 4 as below, $$rcd_{m+1}(i)=rcd_k(m)+\lambda_{drro}(i). 0 \leq i \leq serv\_sector\_max \quad (4)$$

where (m) denotes the order of update operations ($0 \leq m$).

Then, returning to FIG. 2, RRO compensation value Rdrro is obtained (S210).

However, the conventional RRO calculating method, as illustrated in FIG. 2, has a problem in that it takes a relatively long time to obtain the position error signal PES and then calculate RRO. The disk should rotate at least two to four revolutions during the PES sampling operation (S204) to obtain an average PES for the target track. The disk should also rotate at least two to four revolutions during the error correcting operation (S208) to satisfactorily calculate the RRO.

Thus, it takes a relatively long time to obtain the average PES and calculate the RRO. The RRO compensation value Rdrro is obtained for each of disks, tracks, and sectors. To obtain repeatable disturbance drro for all of the tracks on a disk, the required time period per track will be multiplying by the great number of tracks. Thus, as the number of tracks increases in contemporary devices, the problem only increases. That is, the greater the density of a HDD, the longer a period of time is necessary to calculate the RRO compensation value is Rdrro. As a result, production throughput for the HDD suffers and manufacturing costs for the HDD rise.

Because Equation 2 above contains a multiplication function between a frequency domain value and a time domain value (e.g., a convolution function) a great deal of time is generally required to calculate Equation 2.

Further, the transfer function P(z) for plant 104 in Equation 2 is obtained using a modeling process, and thus a mismatch may occur between an actual plant and the modeled plant. Since there is a generally a range of such values among similarly manufactured HDDs, the transfer function P(z) for plant 104 will differ between supposedly identical HDDs.

Further, since the conventional RRO calculating method does not consider deviations in the transfer function P(z), it is difficult to obtain a precise RRO compensation value well tailored to individual HDDs.

U.S. Pat. Nos. 5,793,559 and 6,061,200, the subject matter of which is hereby incorporated by reference, disclose one method of calculating an RRO compensation value in relation to the transfer function P(Z) for each HDD. However, since these methods use a conventional operation, the calculation of RRO remains a lengthy process.

SUMMARY OF THE INVENTION

Embodiments of the invention provide a method of calculating repeatable runout (RRO) for a hard disk drive (HDD) in a significantly reduced time period.

Embodiments of the invention also provide a method of calculating an RRO compensation value using frequency coefficients derived using the RRO calculating method.

Such methods consistent with embodiments of the invention may be provided in the form of a computer-readable recording medium storing a program adapted to implement the methods.

Thus, in one embodiment, the invention provides a method of calculating repeatable runout (RRO) associated with a disk having a plurality of tracks, the method comprising; in relation to a revolution of the disk, calculating a first set of frequency coefficients representing the RRO by analyzing a position error signal (PES), the PES being sampled in the frequency domain in relation to a target track among the plurality of tracks, and calculating the RRO using the first set of frequency coefficients.

In another embodiment, the invention provides a method of calculating a repeatable runout (RRO) compensation value adapted to compensate for RRO in a track following device and control a head of a hard disk drive to follow a target track on a disk, the method comprising; in relation to a revolution of the disk, calculating a first set of frequency coefficients representing the RRO by analyzing a position error signal (PES), the PES being sampled in the frequency domain in relation to the target track during a time period in which the head follows the target track, calculating a sensitivity function associated with the track following device using the first set of frequency coefficients, and calculating an RRO compensation value using the sensitivity function and the first set of frequency coefficients.

In another embodiment, the invention provides a recording medium storing a program adapted to implement a method of calculating repeatable runout (RRO) associated with a disk having a plurality of tracks, the method comprising; in relation to a revolution of the disk, calculating a first set of frequency coefficients representing the RRO by analyzing a position error signal (PES), the PES being sampled in the frequency domain in relation to a target track among the plurality of tracks; and calculating the RRO using the first set of frequency coefficients.

In another embodiment, the invention provides a recording medium storing a program adapted to implement a method of calculating repeatable runout (RRO) in a track following device and control a head of a hard disk drive to follow a target track on a disk, the method comprising; in relation to a revolution of the disk, calculating a first set of frequency coefficients representing the RRO by analyzing a position error signal (PES), the PES being sampled in the frequency domain in relation to the target track during a time period in which the head follows the target track, calculating a sensitivity function associated with the track following device using the first set of frequency coefficients, and calculating an RRO compensation value using the sensitivity function and the first set of frequency coefficients.

DESCRIPTION OF EMBODIMENTS

Figure 1:
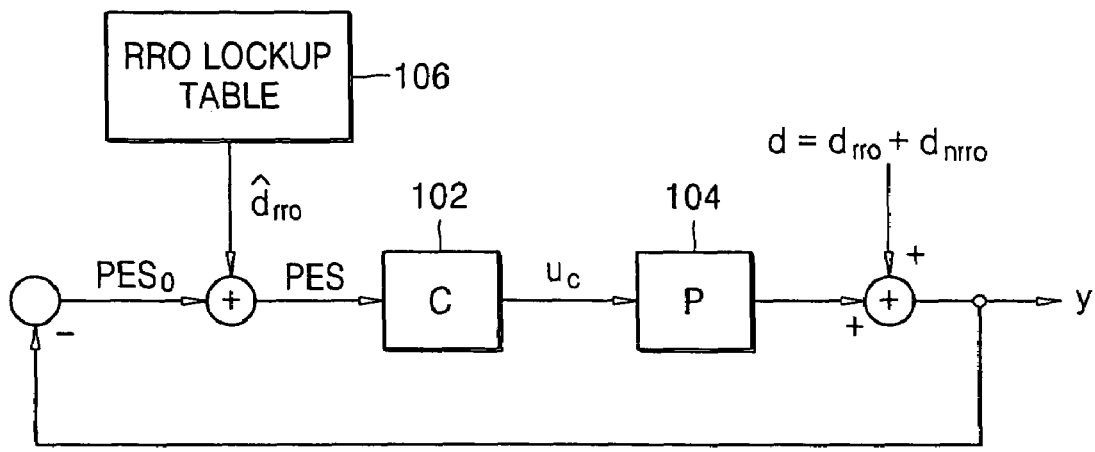
FIG. 1 is a block diagram of a conventional track following device.
Figure 2:
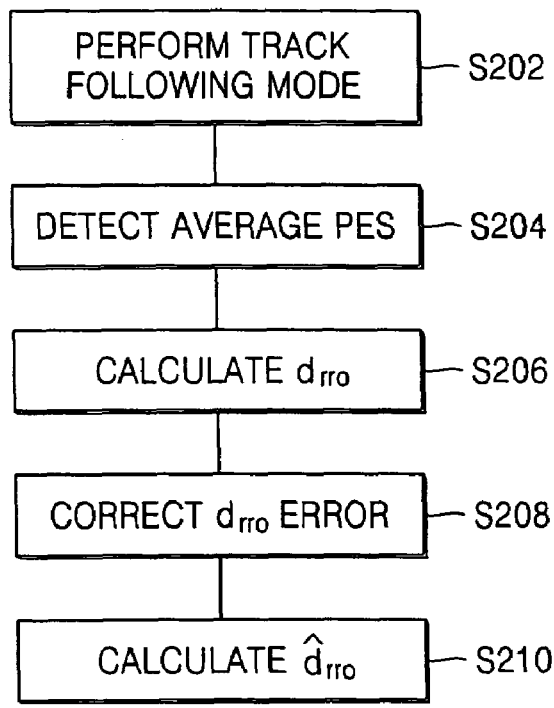
FIG. 2 is a flowchart illustrating a conventional method of calculating an RRO compensation value.

The present invention will now be described more fully with reference to the accompanying drawings, in which preferred embodiments of the invention are shown.

A time-domain signal x(n) consisting of repeatable N samples is expressed as a discrete Fourier signal having 0~(N−1) frequency components by, $$x(n) = \sum_{i=0}^{N-1} X(i) e^{j2\pi \frac{i}{N} n} \qquad (5)$$

where n is a variable in a time domain satisfying 0≦n<N−1, and i is a variable in a frequency domain satisfying 0≦i<N−1.

An Ith frequency component $x_l(n)$ of the signal x(n) is given b, $$\begin{aligned} x_l(n) &= \left[ X(l) e^{j2\pi \frac{l}{N} n} + X(l) * e^{-j2\pi \frac{l}{N} n} \right] \\ &= 2\left[ X_r(l)\cos\left(2\pi \frac{l}{N} n\right) - X_i(l)\sin\left(2\pi \frac{l}{N} n\right) \right] \\ &= W_1(l)\cos\left(2\pi \frac{l}{N} n\right) + W_0(l)\sin\left(2\pi \frac{l}{N} n\right) \end{aligned} \qquad (6)$$

where $X(l)=X_r(l)+jX_i(l)$, $W_1(l)=2X_r(l)$, and $W_0(l)=-2X_i(l)$.

The x(n) of Equation 5 may also be given by Equation 7.

$$\begin{aligned} X(i) &= \frac{1}{N} \sum_{i=0}^{N-1} x(n) e^{-j2\pi \frac{i}{N} n} \\ &= X_r(i) + jX_i(i) \end{aligned} \qquad (7)$$

Under the conditions q=1, 2, . . . , N, Yr(0)=0, and Yi(0)=0, Xr and Xi can be expressed using a recursive analyzing method by, $$Y_r(q) = x(N-q) + \left[ Y_r(q-1)\cos\left(2\frac{\pi}{N}i\right) + Y_i(q-1)\sin\left(2\frac{\pi}{N}i\right) \right] \qquad (8)$$

$$Y_i(q) = -Y_r(q-1)\sin\left(2\frac{\pi}{N}i\right) + Y_i(q-1)\cos\left(2\frac{\pi}{N}i\right)$$

where q is the index of queues in which the samples of 0 through (N−1) in the time domain are stored; and Yr and Yi are values obtained by taking the recursive analyzing method on the x(0)~x(N−1) samples stored in the queues.

Equation 9 below can be achieved by Equation 8.

$$X_r(i) = \frac{1}{N} Y_r(N), \quad X_i(i) = \frac{1}{N} Y_i(N) \qquad (9)$$

Referring to Equations 8 and 9, it is seen that frequency coefficients X(i) of the time-domain signal x(n) can be obtained by sequentially storing the time-domain signal x(n) consisting of the N samples in the N queues and performing the recursive analysing method on the samples stored in the N queues.

In other words, the frequency coefficients of the position error signal PES(n), that is, the frequency coefficients for representing RRO in the frequency domain, can be obtained by storing the time-domain position error signal PES(n) in the N queues and performing the recursive analyzing method.

RPES(t) in the time domain can be expressed using the frequency domain by Equation 10 as follows.

$$RPES(t) = \sum_{k=i}^{\infty} [w_0(k)\sin(k\Omega t) + w_1(k)\cos(k\Omega t)] \qquad (10)$$

where k is the order of a harmonic wave and Ω is a basic angular frequency. In a hard disk drive (HDD) of 7,200 rpm, a basic frequency f is 120 Hz, and a basic angular frequency is 2πf.

In Equation 10, w0 and w1 represent frequency coefficients, Ts is a time interval, i.e., a sampling time, between servo samples. The frequency coefficients w0 and w1 are obtained by performing the recursive analyzing method on the position error signal PES(n) as described with reference to Equations 5 through 9. Since most operations in Equations 5 through 9 are sine and cosine operations that are available for most digital signal processors (DSP), the frequency coefficients for representing the RRO can be easily calculated.

When harmonic waves with a through b orders are dominant in practical applications, necessary RPESab(nTs) is given by Equation 11.

$$RPES_{ab}(nT_s) = \sum_{k=a}^{a+b} [w_0(k)\sin(k\Omega nT_s) + w_1(k)\cos(k\Omega nT_s)] \qquad (11)$$

Resources for RRO compensation can be reduced using this frequency selectivity.

An RRO compensation value Rdrro(t) is expressed in the frequency domain by Equation 12 as follows.

$$\hat{d}_{rro}(nT_s) = \sum_{k=a}^{a+b} [v_0(k)\sin(k\Omega t) + v_1(k)\cos(k\Omega t)] \qquad (12)$$

where v0 and v1 represent frequency coefficients and the relationship with the frequency coefficients w0 and w1 can be expressed by Equation 13 as follows.

$$v_0(k) = [w_1(k)S_i - w_0(k)S_r]/(S_r^2 + S_i^2)$$

$$v_1(k) = [w_1(k)S_r - w_0(k)S_i]/(S_r^2 + S_i^2)$$

$$S|_{\omega=k\Omega} = S_r + jS_i \qquad (13)$$

where S is a sensitivity function of a track following device as shown in FIG. 1, Sr is a real component of the sensitivity function S, and Si is an imaginary component of the sensitivity function S.

Referring to Equations 10 through 13, Rdrro(nTs) can be derived by obtaining the frequency coefficients w0 and w1 through the recursive analyzing method performed on PES(n) and obtaining the frequency coefficients v0 and v1 using the frequency coefficients w0 and w1.

Since the frequency coefficients w0 and w1 are obtained using the recursive analyzing method, the RRO can be satisfactorily and precisely calculated with only the position error signal PES(n) obtained through one revolution of a disk, instead of an average position error signal PES obtained through several revolutions of the disk. If the average position error signal PES is used, the RRO can be calculated more precisely.

Since the frequency coefficients w0 and w1 are obtained using the recursive analyzing method, the frequency coefficients for representing the RRO can be obtained faster than when the frequency coefficients w0 and w1 are obtained using a Fourier transform. Since the frequency coefficients v0 and v1 are obtained using the multiplication in the frequency domain, the frequency coefficients v0 and v1 can be calculated faster than when they are calculated using a convolution operation.

The value of the sensitivity function S in Equation 13 is a frequency domain scalar. Thus, the sensitivity function S may be obtained by dividing the position error signal PES in a certain frequency by the repeatable disturbance drro in the frequency domain. Unlike the conventional method, since the real sensitivity function, that is, the transfer function P(z) of the real plant, is used according to the present invention, the RRO compensation value can be obtained using the precise sensitivity function irrespective of the deviation of the HDD.

Figure 3:
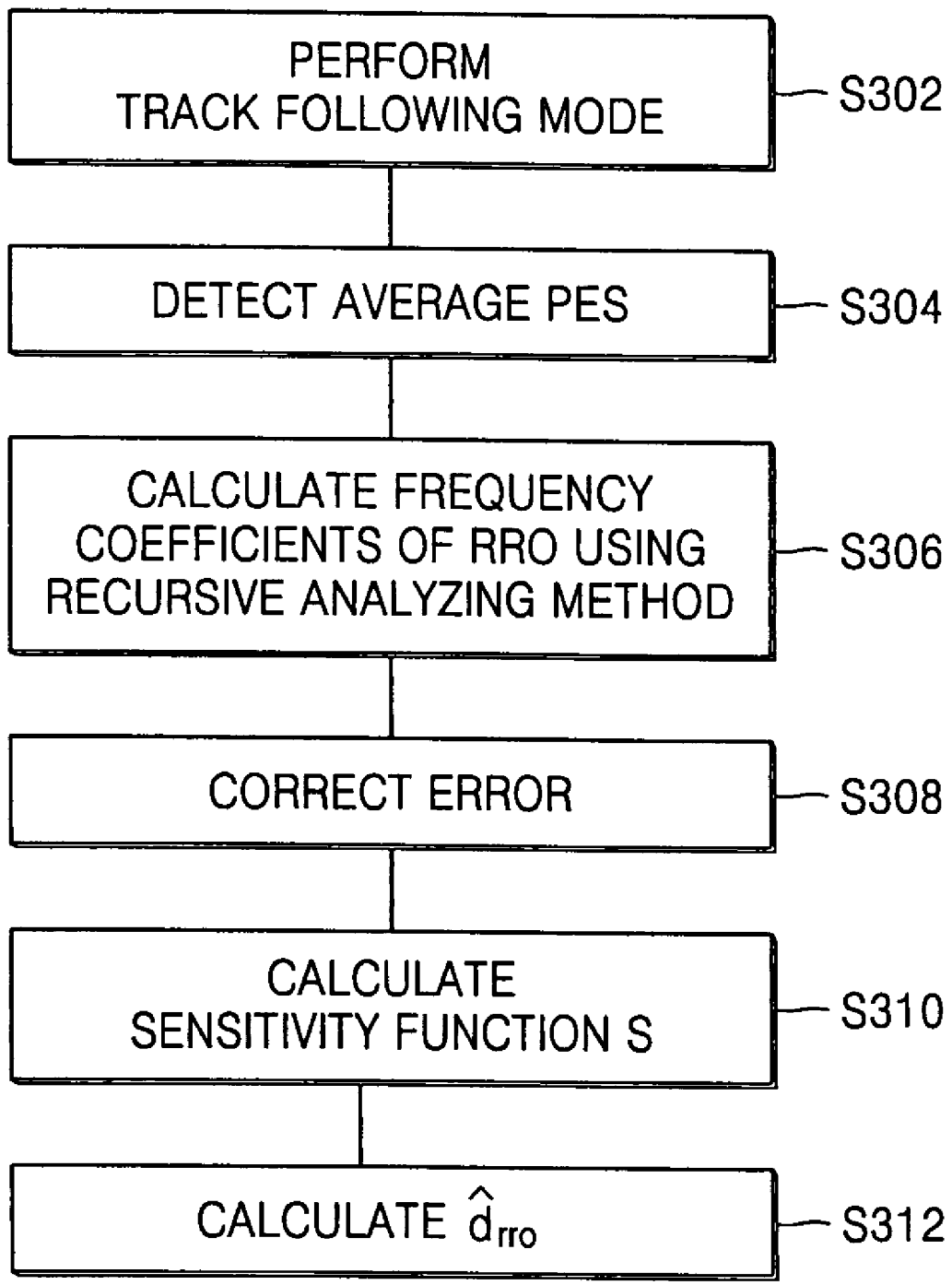
FIG. 3 is a flowchart illustrating a method of calculating an RRO compensation value according to an embodiment of the present invention.

FIG. 3 is a flow chart illustrating a method of calculating an RRO compensation value according to an embodiment of the present invention.

A track following operation is performed so that a head follows a target track (S302). Then, a position error signal PES is sampled while the head follows the target track (S304). The position error signal PES is sampled at time intervals corresponding to servo samples.

Frequency coefficients w0 and w1 representing RRO are calculated using a recursive analyzing method from N PES samples using Equations 5 through 9 (S306). The frequency coefficient w0 is a set of frequency coefficients of imaginary components, and the frequency coefficient w1 is a set of frequency coefficients of real components.

Frequency coefficients w0 and w1 are then again calculated while the disk rotates once (S308), and the previously calculated frequency coefficients w0 and w1 are corrected by a minimum mean error using the frequency coefficients w0 and w1 calculated (S310).

Correction by the minimum mean error is given by, $$w_0(k)_{m+1} = w_0(k)_m + 2\eta \sum_{n=1}^{N} RPES(nT_s)\sin(k\Omega T_s) \quad (14)$$

$$w_1(k)_{m+1} = w_1(k)_m + 2\eta \sum_{n=1}^{N} RPES(nT_s)\cos(k\Omega T_s)$$

where (n) is the number of target tracks and (m) is the order of update operations.

An RRO compensation value Rdrro for compensating RRO is then calculated using Equations 10 through 13 (S312).

The RRO compensation value Rdrro may then be stored on the disk. One method of recording the RRO compensation value Rdrro in servo sectors of a disk is disclosed, for example, in commonly assigned U.S. Pat. No. 6,049,440, the subject matter of which is hereby incorporated by reference.

Figure 4:
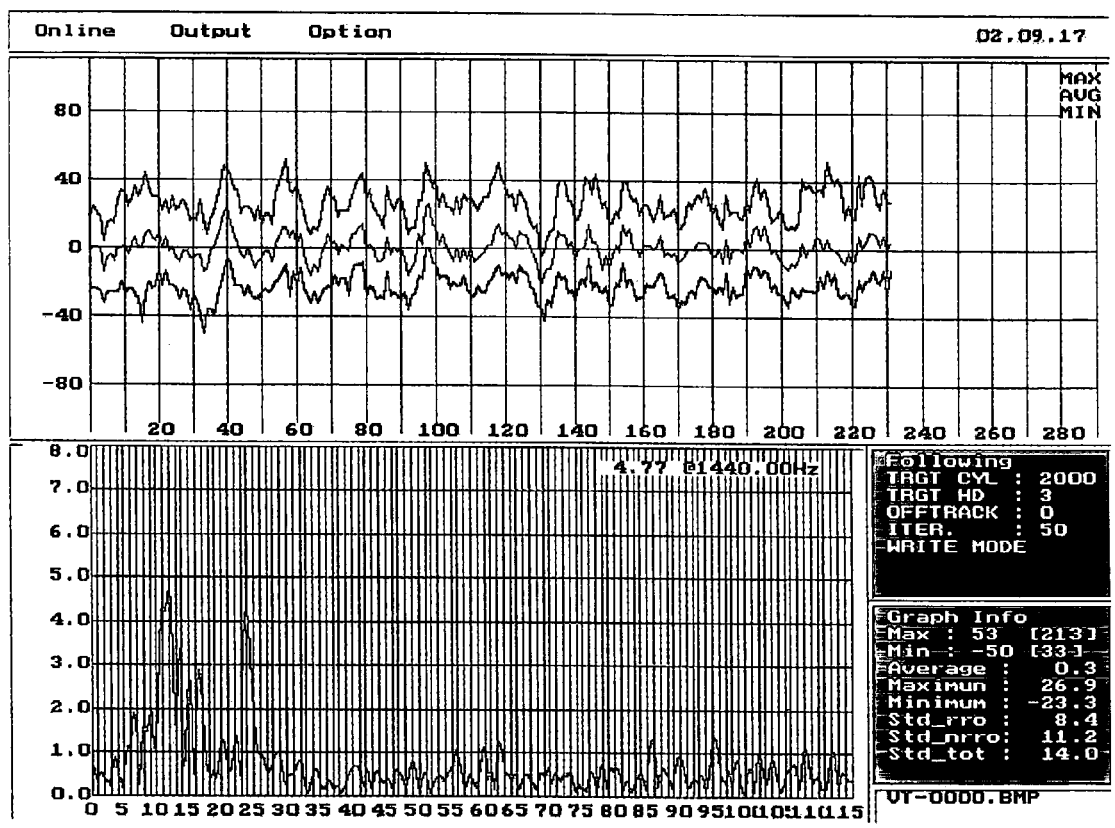
FIG. 4 is a graph illustrating waveforms resulted when RRO compensation is not applied in a track following mode.

FIG. 4 is a graph illustrating waveforms resulted when RRO compensation is not applied in a track following mode. Referring to FIG. 4, a standard deviation due to RRO is 8.4 and a total standard deviation is 14.0. A track is divided into 512 steps. When the standard deviation is 14, the head moves within 14 steps from a track central line.

Figure 5:
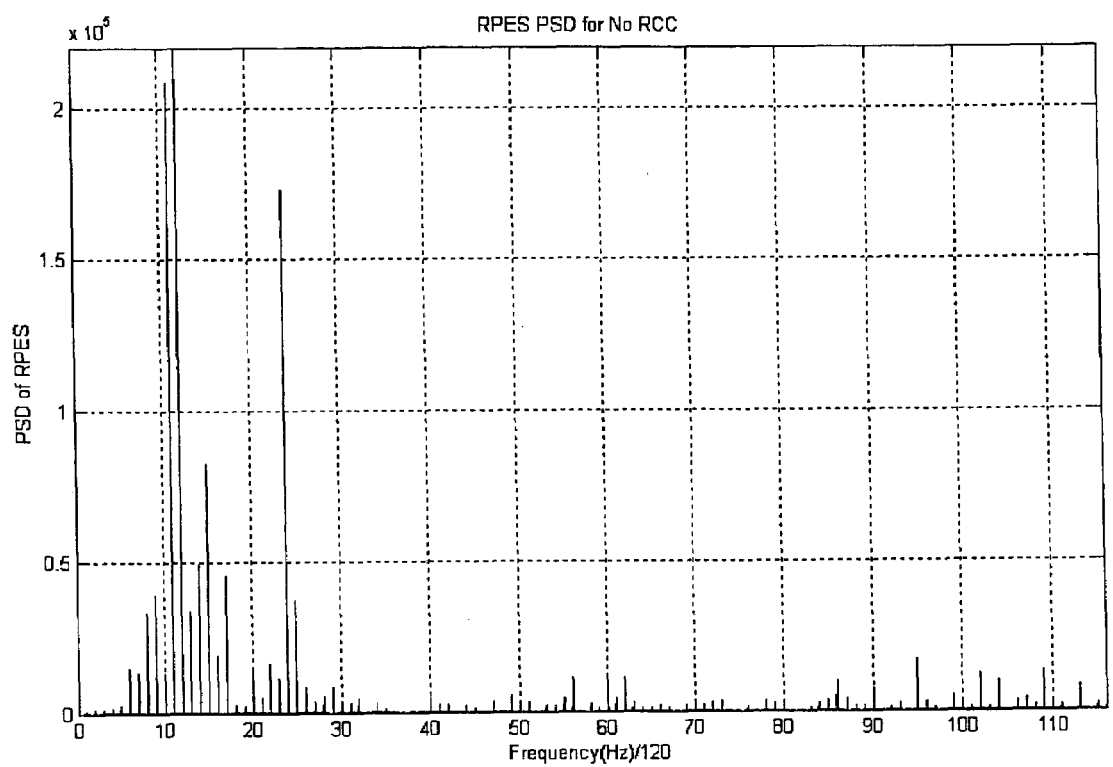
FIG. 5 is a graph illustrating RRO frequency coefficients of FIG. 4.

FIG. 5 is a graph illustrating RRO frequency coefficients of FIG. 4. Referring to FIG. 5, the horizontal axis represents the order of a harmonic wave. A basic frequency of the RRO is determined by the regular revolution speed of the HDD. For example, a basic frequency of a disk rotating at 7,200 rpm is 120 Hz.

Figure 6:
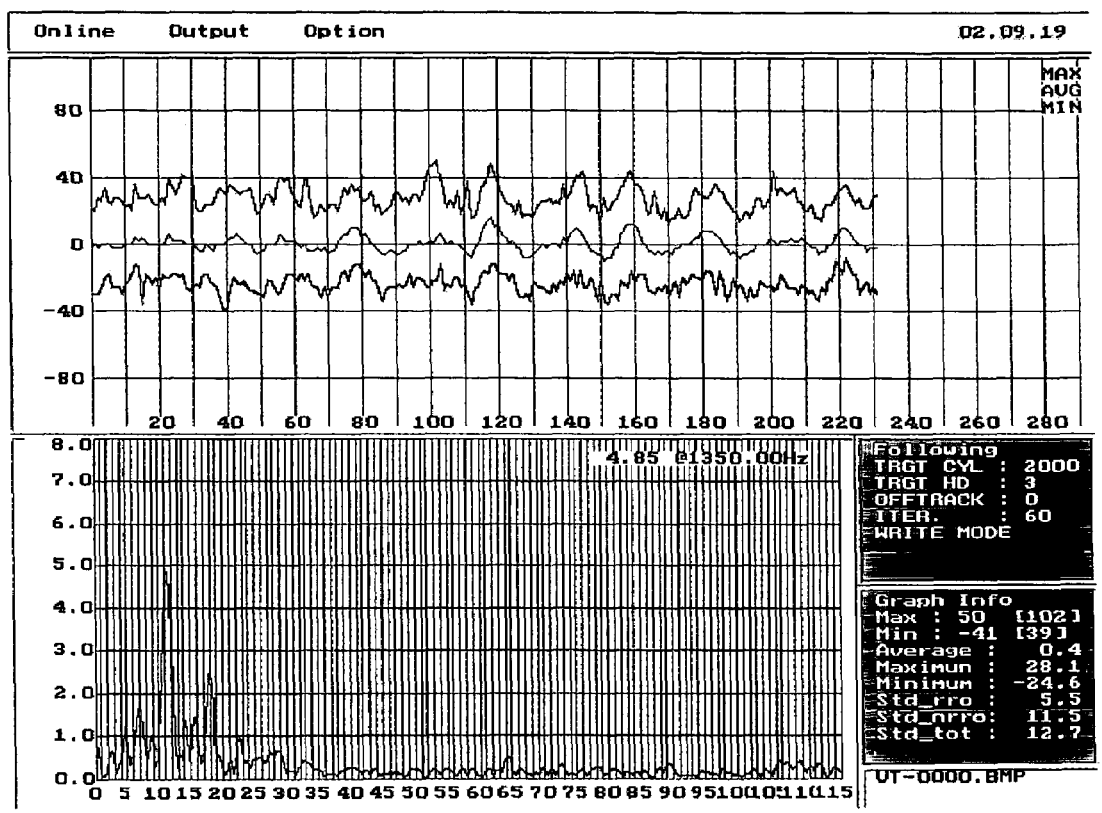
FIGS. 6 and 7 are graphs illustrating waveforms resulted when an RRO compensation value obtained according to the method of the present invention is applied.
Figure 7:
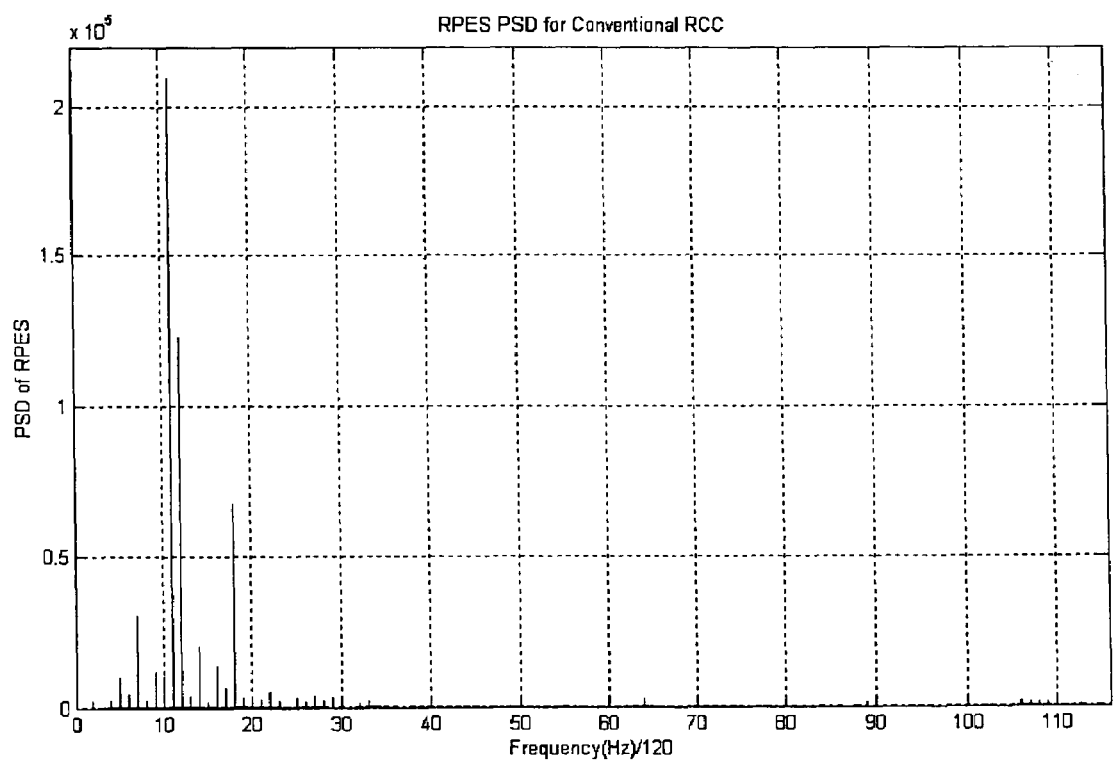

FIGS. 6 and 7 are graphs illustrating waveforms resulted when an RRO compensation value obtained using a conventional method is applied. FIGS. 6 and 7 show the result when an average PES is obtained with respect to four revolutions of the disk and an error correction is performed twice.

Referring to FIG. 6, a standard deviation due to RRO is 5.5, and an overall standard deviation is 12.7. That is, the head can more stably follow the centre of a track after the RRO compensation. Further, referring to FIG. 7, it can be seen that the effect of RRO compensation increases by an error correction.

Figure 8:
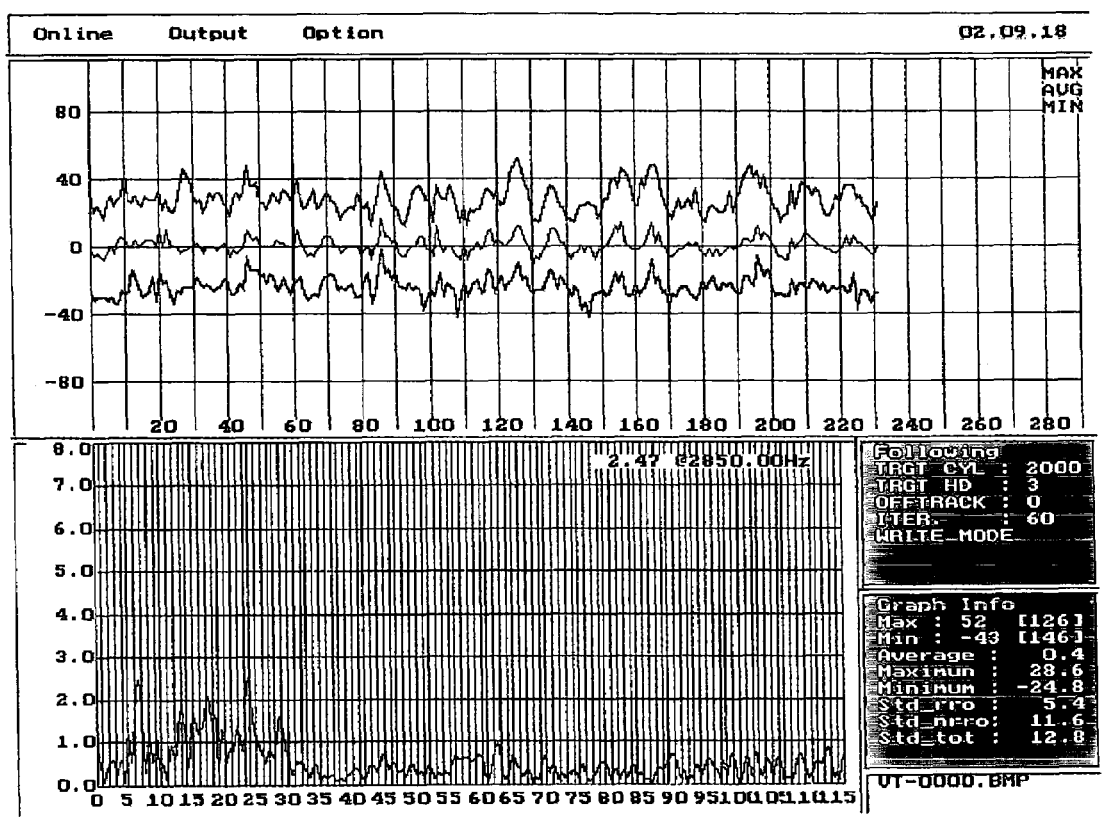
FIGS. 8 and 9 are graphs illustrating waveforms resulted when an RRO compensation value obtained according to the method of the present invention is applied.
Figure 9:
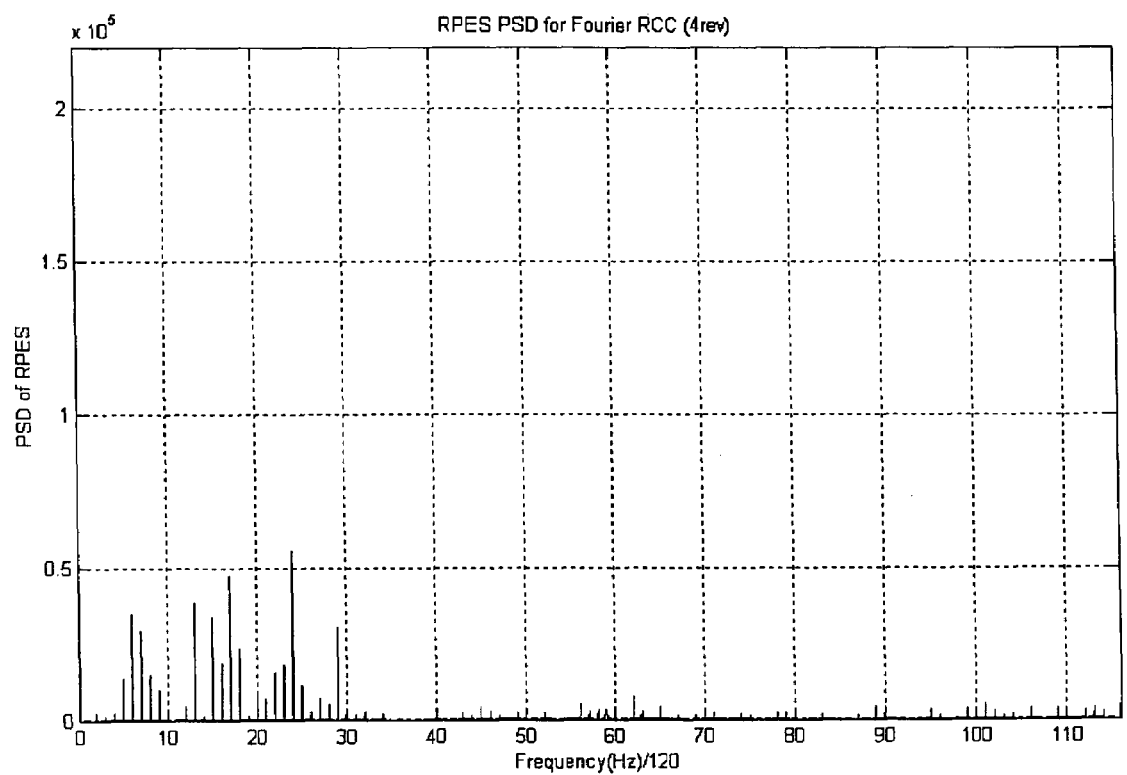

FIGS. 8 and 9 are graphs illustrating waveforms resulted when an RRO compensation value obtained according to an embodiment of the invention is applied. FIGS. 8 and 9 show the result when an average PES is obtained with respect to four revolutions of the disk and no error correction is performed.

Referring to FIG. 8, a standard deviation due to RRO is 5.4, and an overall standard deviation is 12.8. Referring to FIGS. 6 and 8, it can be seen that, even though no error correction is done, the effect of RRO compensation increases as compared with the conventional method.

Figure 10:
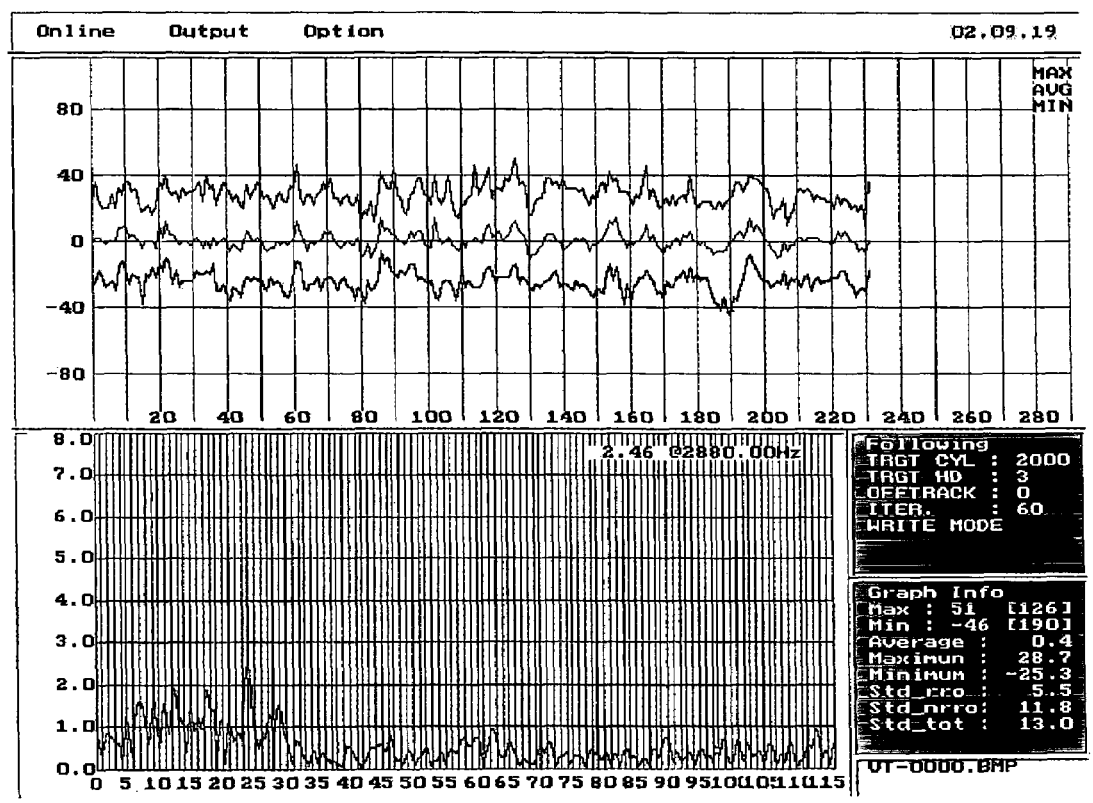
FIGS. 10 and 11 are graphs illustrating further waveforms resulted when an RRO compensation values obtained according to the method of the present invention is applied.
Figure 11:
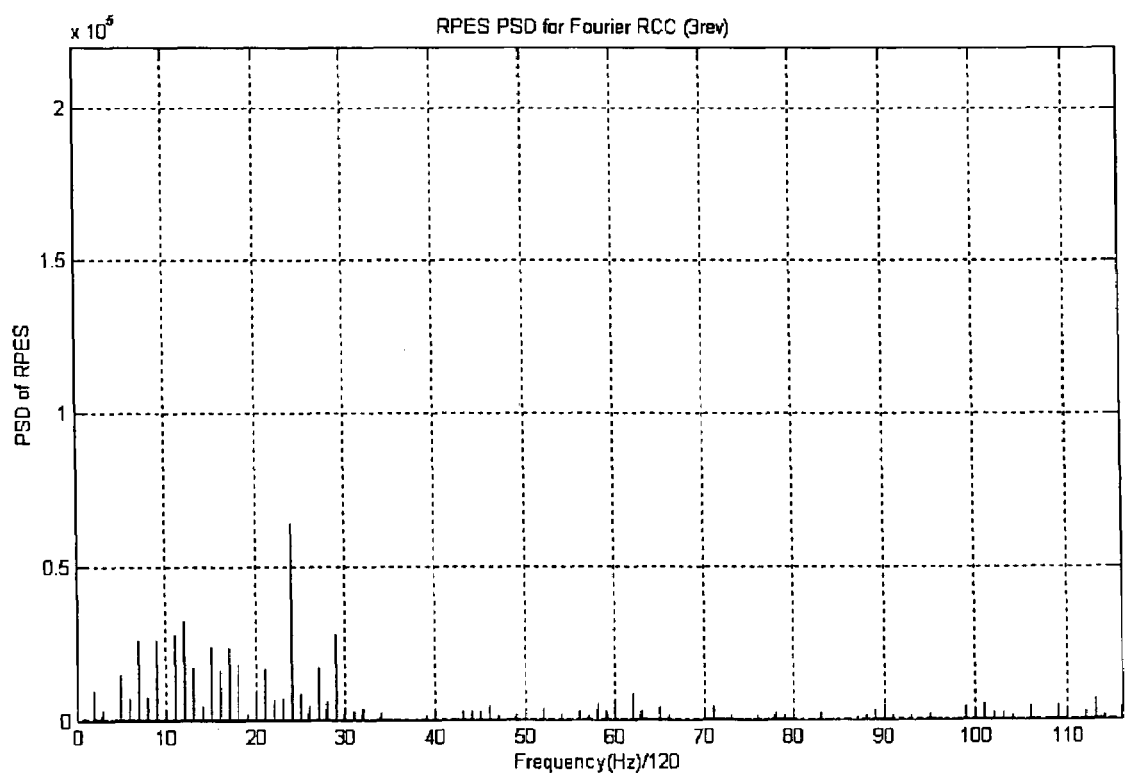

FIGS. 10 and 11 are graphs illustrating waveforms that result when an RRO compensation value obtained according to an embodiment of the invention is applied.

FIGS. 10 and 11 show the result when an average PES is obtained with respect to three revolutions of the disk and no error correction is performed.

Referring to FIG. 10, a standard deviation due to RRO is 5.5, and an overall standard deviation is 13.0. Referring to FIGS. 10 and 8, it can be seen that an average PES may be obtained with a smaller number of disk revolutions as compared with the conventional method.

Figure 12:
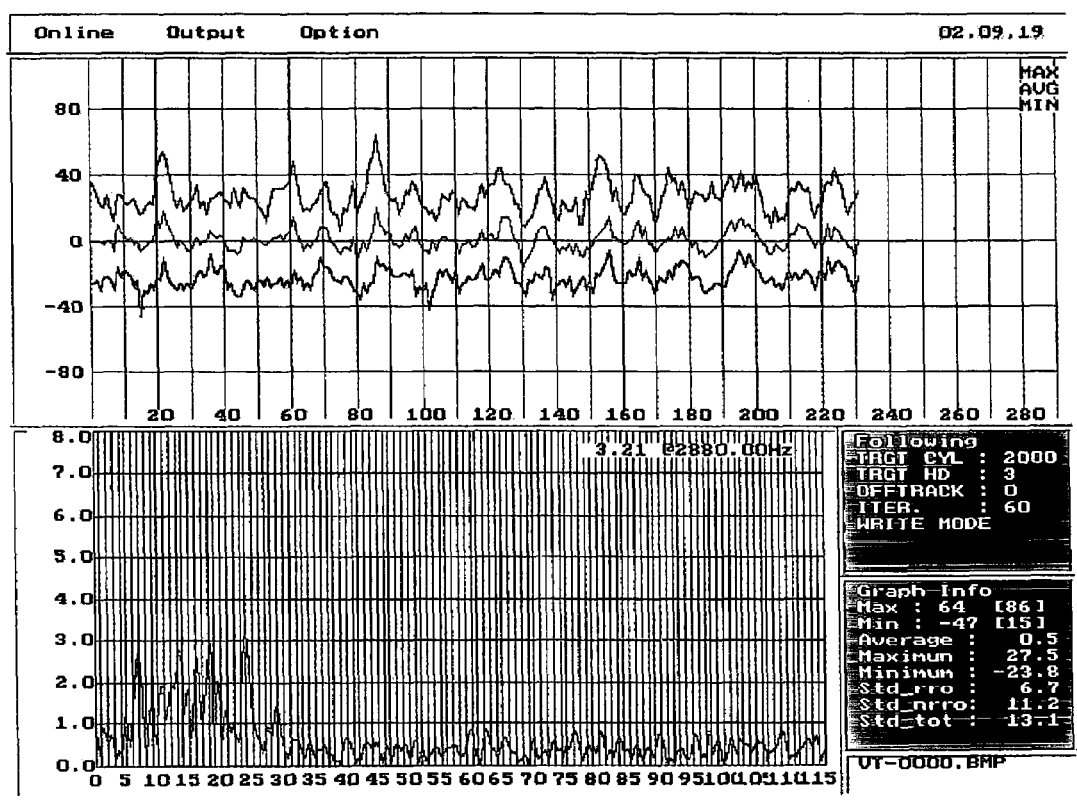
FIGS. 12 and 13 are graphs illustrating further waveforms resulted when an RRO compensation value obtained according to the method of the present invention is applied.
Figure 13:
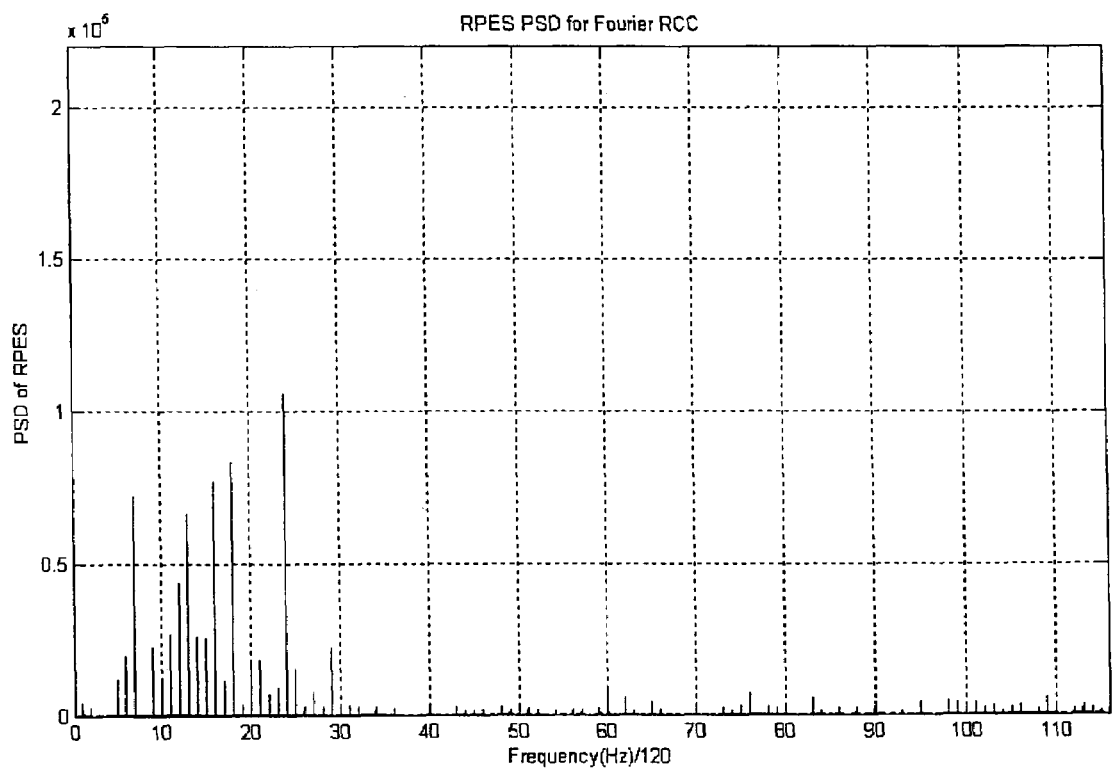

FIGS. 12 and 13 are graphs illustrating waveforms that result when an RRO compensation value obtained according to an embodiment of the invention is applied.

FIGS. 12 and 13 show the result when an average PES is obtained with respect to two disk revolutions and no error correction is performed.

Referring to FIG. 12, a standard deviation due to RRO is 6.7, and an overall standard deviation is 13.1. Referring to FIGS. 12 and 10, it can be seen that similar effect can be achieved irrespective of the number of disk revolutions.

Figure 14:
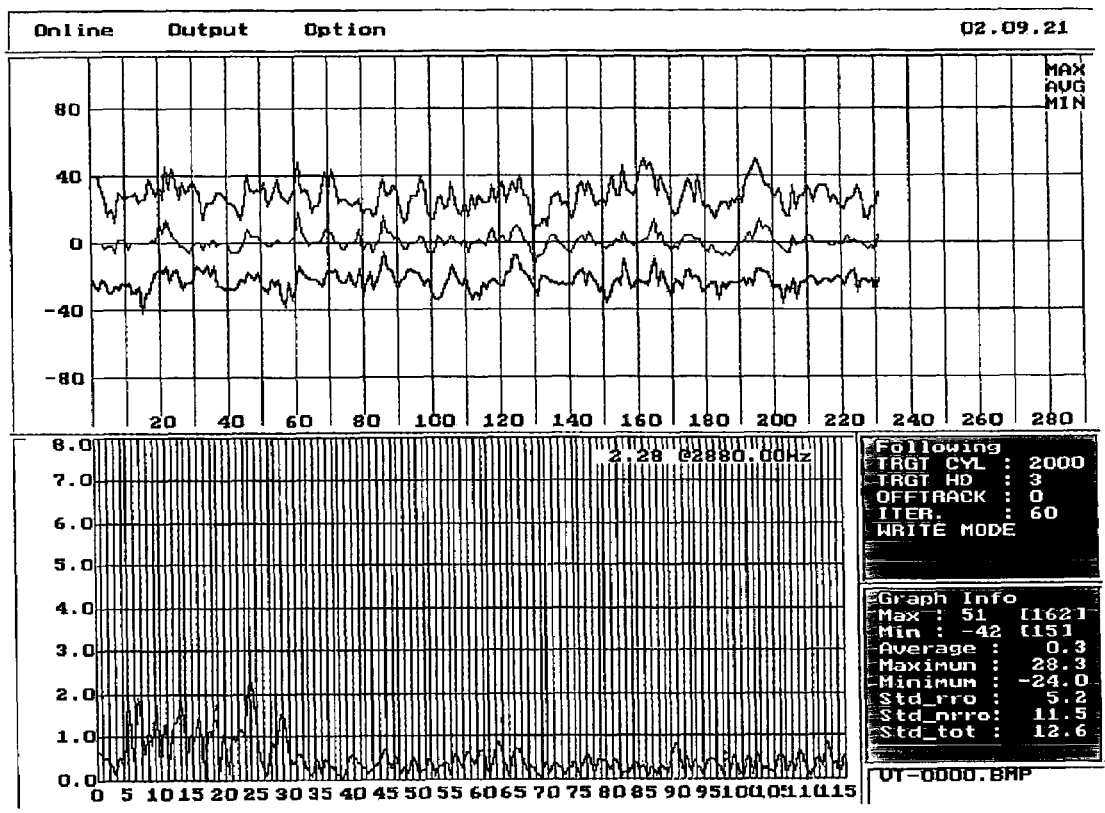
FIGS. 14 and 15 are graphs illustrating further waveforms resulted when an RRO compensation value obtained according to the method of the present invention is applied.
Figure 15:
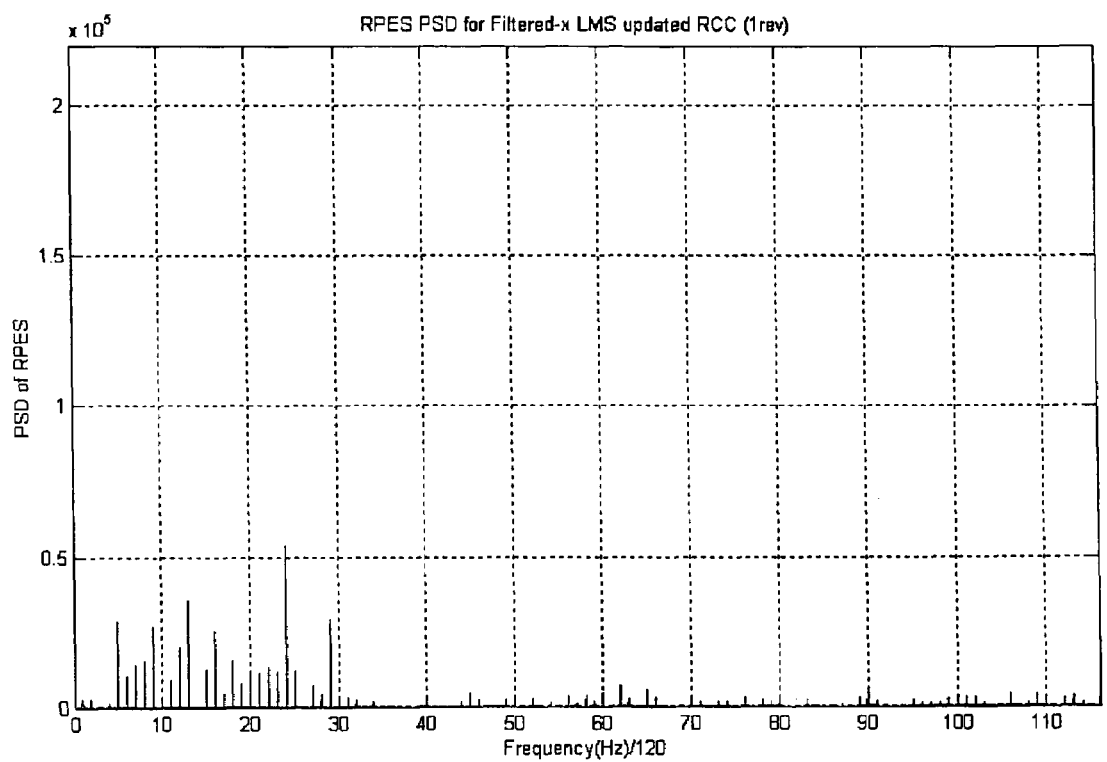

FIGS. 14 and 15 are graphs illustrating waveforms that result when an RRO compensation value obtained according to an embodiment of the invention is applied. FIGS. 14 and 15 show the result when an average PES is obtained with respect to three disk revolutions and an error correction is performed once.

Referring to FIG. 14, a standard deviation due to RRO is 5.2, and an overall standard deviation is 12.6. Referring to FIGS. 14 and 6, it can be seen that the average PES may be obtained with a smaller number of disk revolutions and a higher performance may be achieved with a smaller number of error corrections as compared with the conventional method.

Figure 16:
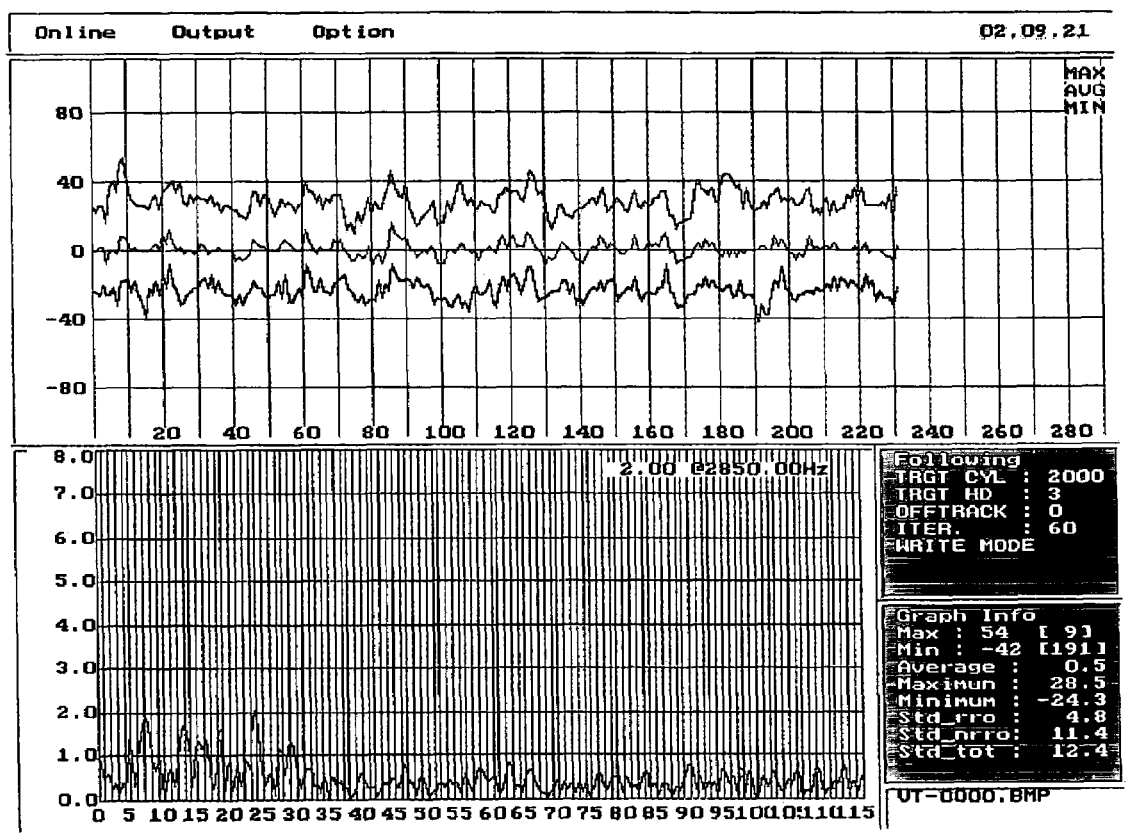
FIGS. 16 and 17 are graphs illustrating further waveforms resulted when an RRO compensation value obtained according to the method of the present invention is applied.
Figure 17:
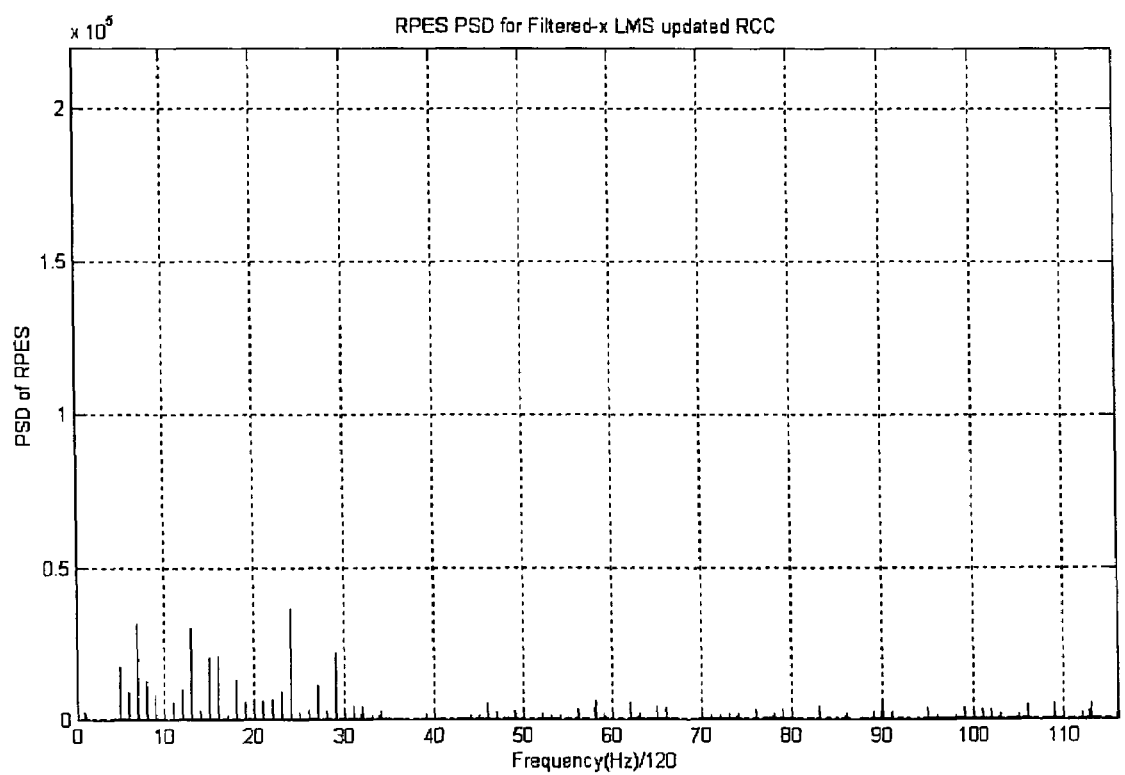

FIGS. 16 and 17 are graphs illustrating waveforms that result when an RRO compensation value obtained according to an embodiment of the invention is applied. FIGS. 16 and 17 show the result when an average PES is obtained with respect to three disk revolutions and an error correction is performed once by an average PES obtained with respect to two disk revolutions. Referring to FIG. 16, a standard deviation due to RRO is 4.8, and an overall standard deviation is 12.4. Referring to FIGS. 16 and 14, it can be seen that, even though error corrections are performed, similar effect can be achieved as compared with the conventional method.

Figure 18:
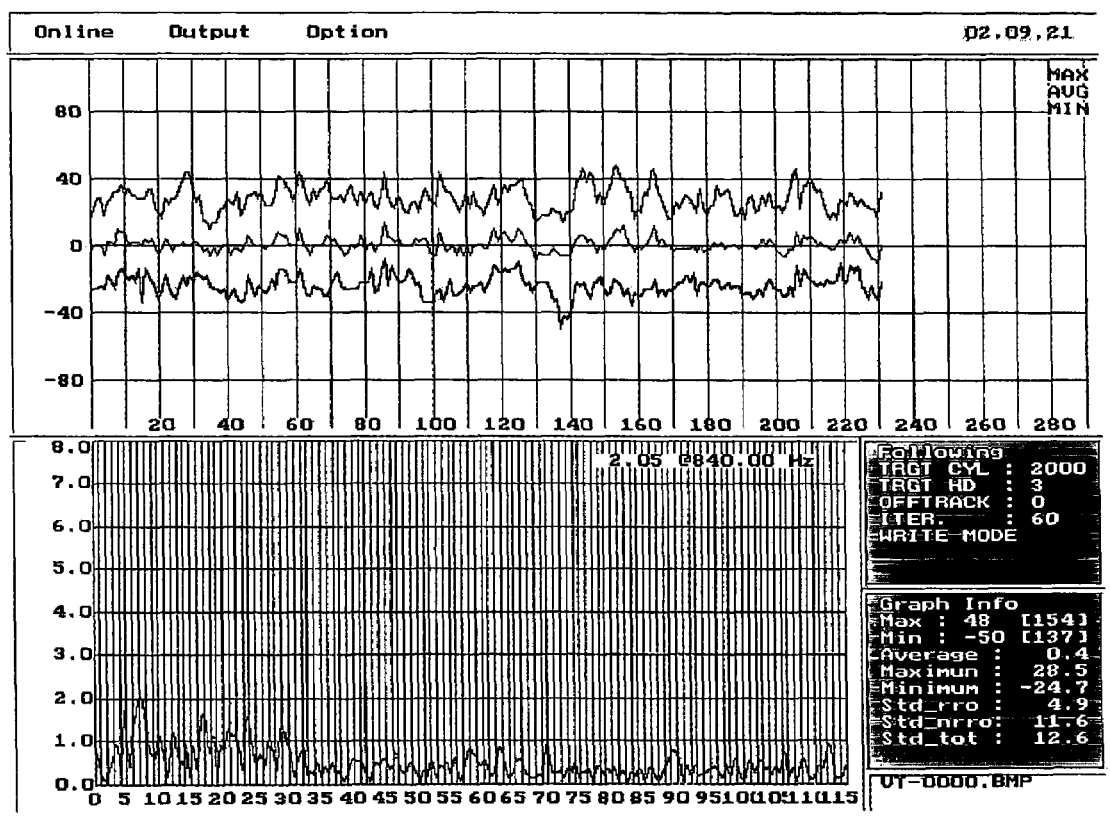
FIGS. 18 and 19 are graphs illustrating further waveforms resulted when an RRO compensation value obtained according to the method of the present invention is applied.
Figure 19:
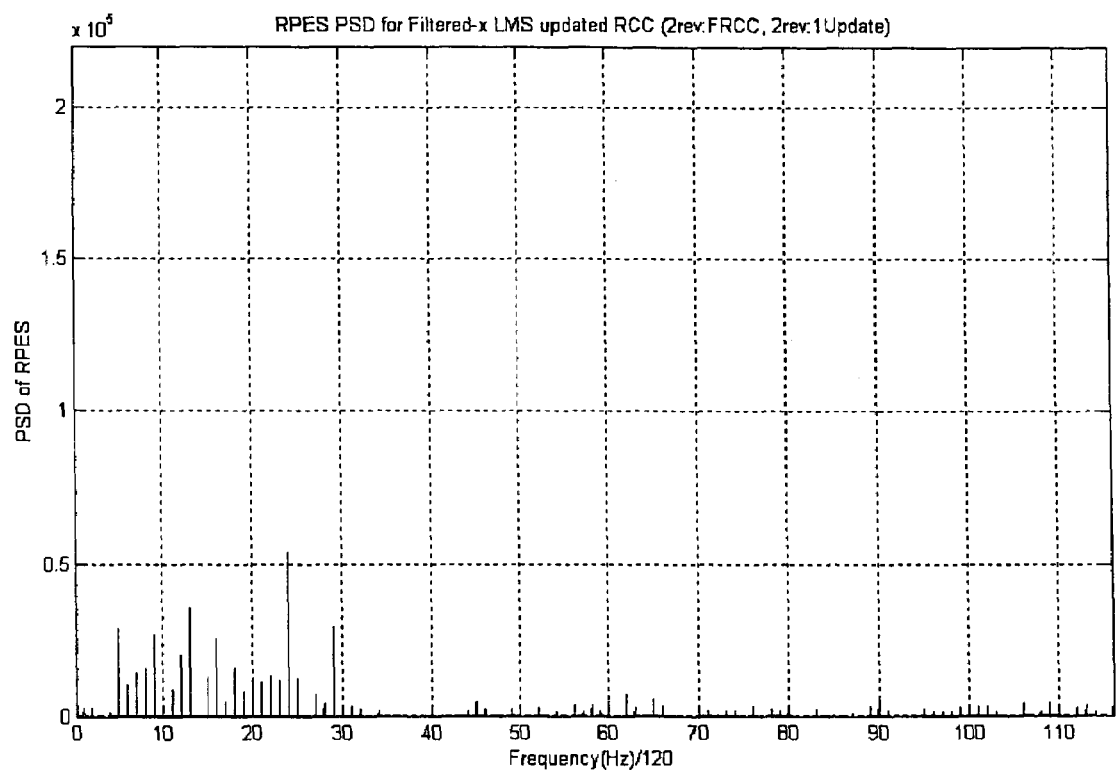

FIGS. 18 and 19 are graphs illustrating waveforms when an RRO compensation value obtained according to an embodiment of the invention is used. FIGS. 18 and 19 show the result when an average PES is obtained with respect to two disk revolutions and an error correction is performed once by an average PES obtained with respect to one disk revolution.

Referring to FIG. 18, a standard deviation due to RRO is 4.9, and an overall standard deviation is 12.6. Referring to FIGS. 18 and 19, it can be seen that, even though RRO compensation values are calculated and an error correction is performed with respect to fewer disk revolutions in embodiments of the invention, similar effect can be achieved as compared with the conventional method.

Various embodiments of the invention may be provided in the form of computer-readable code written to a computer-readable medium. Computer-readable recording medium may include all kinds of recording devices in which data readable by a computer system is stored. Examples of the computer-readable recording devices include ROMs, RAMs, CD-ROMs, magnetic tapes, floppy disks, optical data storage devices, and the like.

As described above, since the method of calculating RRO according to embodiments of the invention can precisely calculate the RRO with as few as a single disk revolution, the time required to calculate the RRO and an RRO compensation value in constituent HDD manufacturing method may be dramatically reduced.

While the present invention has been particularly shown and described with reference to exemplary embodiments thereof, it will be understood by those of ordinary skill in the art that various changes in form and details may be made therein without departing from the scope of the invention as defined by the following claims.

What is claimed is:

1. A method of calculating repeatable runout (RRO) associated with a disk having a plurality of tracks, the method comprising:
   in relation to a revolution of the disk, calculating a first set of frequency coefficients representing the RRO by analyzing a position error signal (PES), the PES being sampled in the frequency domain in relation to a target track among the plurality of tracks; and
   calculating the RRO using the first set of frequency coefficients.

2. The method of claim 1, wherein calculating the first set of frequency coefficients comprises performing a recursive analyzing method using N samples of the PES, where N is a natural number.

3. The method of claim 1, further comprising:
   in relation to another revolution of the disk, calculating a second set of frequency coefficients; and
   correcting the first set of frequency coefficients using a minimum mean error between the first and second sets of frequency coefficients.

4. A method of calculating a repeatable runout (RRO) compensation value adapted to compensate for RRO in a track following device and control a head of a hard disk drive to follow a target track on a disk, the method comprising:
   in relation to a revolution of the disk, calculating a first set of frequency coefficients representing the RRO by analyzing a position error signal (PES), the PES being sampled in the frequency domain in relation to the target track during a time period in which the head follows the target track;
   calculating a sensitivity function associated with the track following device using the first set of frequency coefficients; and
   calculating an RRO compensation value using the sensitivity function and the first set of frequency coefficients.

5. The method of claim 4, wherein calculating the first set of frequency coefficients comprises performing a recursive analyzing method using N samples of the PES, where N is a natural number.

6. The method of claim 4, further comprising:
   in relation to another revolution of the disk, calculating a second set of frequency coefficients; and
   correcting the first set of frequency coefficients using a minimum mean error between the first and second sets of frequency coefficients.

7. A recording medium storing a program adapted to implement a method of calculating repeatable runout (RRO) associated with a disk having a plurality of tracks, the method comprising:
   in relation to a revolution of the disk, calculating a first set of frequency coefficients representing the RRO by analyzing a position error signal (PES), the PES being sampled in the frequency domain in relation to a target track among the plurality of tracks; and
   calculating the RRO using the first set of frequency coefficients.

8. The method of claim 7, wherein calculating the first set of frequency coefficients comprises performing a recursive analyzing method using N samples of the PES, where N is a natural number.

9. The method of claim 7, further comprising:
   in relation to another revolution of the disk, calculating a second set of frequency coefficients; and
   correcting the first set of frequency coefficients using a minimum mean error between the first and second sets of frequency coefficients.

10. A recording medium storing a program adapted to implement a method of calculating repeatable runout (RRO) in a track following device and control a head of a hard disk drive to follow a target track on a disk, the method comprising:
    in relation to a revolution of the disk, calculating a first set of frequency coefficients representing the RRO by analyzing a position error signal (PES), the PES being sampled in the frequency domain in relation to the target track during a time period in which the head follows the target track;

calculating a sensitivity function associated with the track following device using the first set of frequency coefficients; and calculating an RRO compensation value using the sensitivity function and the first set of frequency coefficients.

11. The method of claim 10, wherein calculating the first set of frequency coefficients comprises performing a recursive analyzing method using N samples of the PES, where N is a natural number.

12. The method of claim 10, further comprising:

in relation to another revolution of the disk, calculating a second set of frequency coefficients; and correcting the first set of frequency coefficients using a minimum mean error between the first and second sets of frequency coefficients.

* * * * *